United States Patent [19]

Lusignea et al.

[11] Patent Number: 4,477,977
[45] Date of Patent: Oct. 23, 1984

[54] METHOD AND APPARATUS INVOLVING THE MEASUREMENT OF BORES

[75] Inventors: Richard W. Lusignea, Brighton; George J. Kirby, Allston; Charles F. Mariano, Framingham, all of Mass.

[73] Assignee: Foster-Miller, Inc., Waltham, Mass.

[21] Appl. No.: 433,555

[22] Filed: Oct. 8, 1982

[51] Int. Cl.³ .............................................. G01B 5/12
[52] U.S. Cl. .................................. 33/178 R; 33/147 K
[58] Field of Search ............ 33/178 R, 178 F, 147 K, 33/DIG. 2

[56] References Cited

U.S. PATENT DOCUMENTS

| 1,507,272 | 9/1924 | Buckingham | 33/178 R |
|---|---|---|---|
| 2,329,067 | 9/1943 | Maag | 33/178 R |
| 2,369,319 | 2/1945 | Smith | 33/178 R |
| 2,508,496 | 5/1950 | Conzelman, Jr. et al. | 33/178 R |
| 2,566,970 | 9/1951 | Swensson | 33/178 R |
| 4,146,968 | 4/1979 | Tovey | 33/178 R |
| 4,320,579 | 3/1982 | Kinley et al. | 33/178 R |

Primary Examiner—Willis Little
Attorney, Agent, or Firm—Herbert L. Bello

[57] ABSTRACT

A method and apparatus for non-destructively measuring the internal volume and nominal diameter of cylindrical or substantially cylindrical bores. The apparatus includes an expander with an expandable outer skin, the expander is configured to be inserted into the bore being measured. A fluid contained within a pump associated with the expander is forced into the expander. The fluid causes the skin to expand and press against the side of the bore being measured. The quantity of fluid required to press the expander skin against the bore is related to the internal volume and nominal diameter of the bore.

18 Claims, 2 Drawing Figures

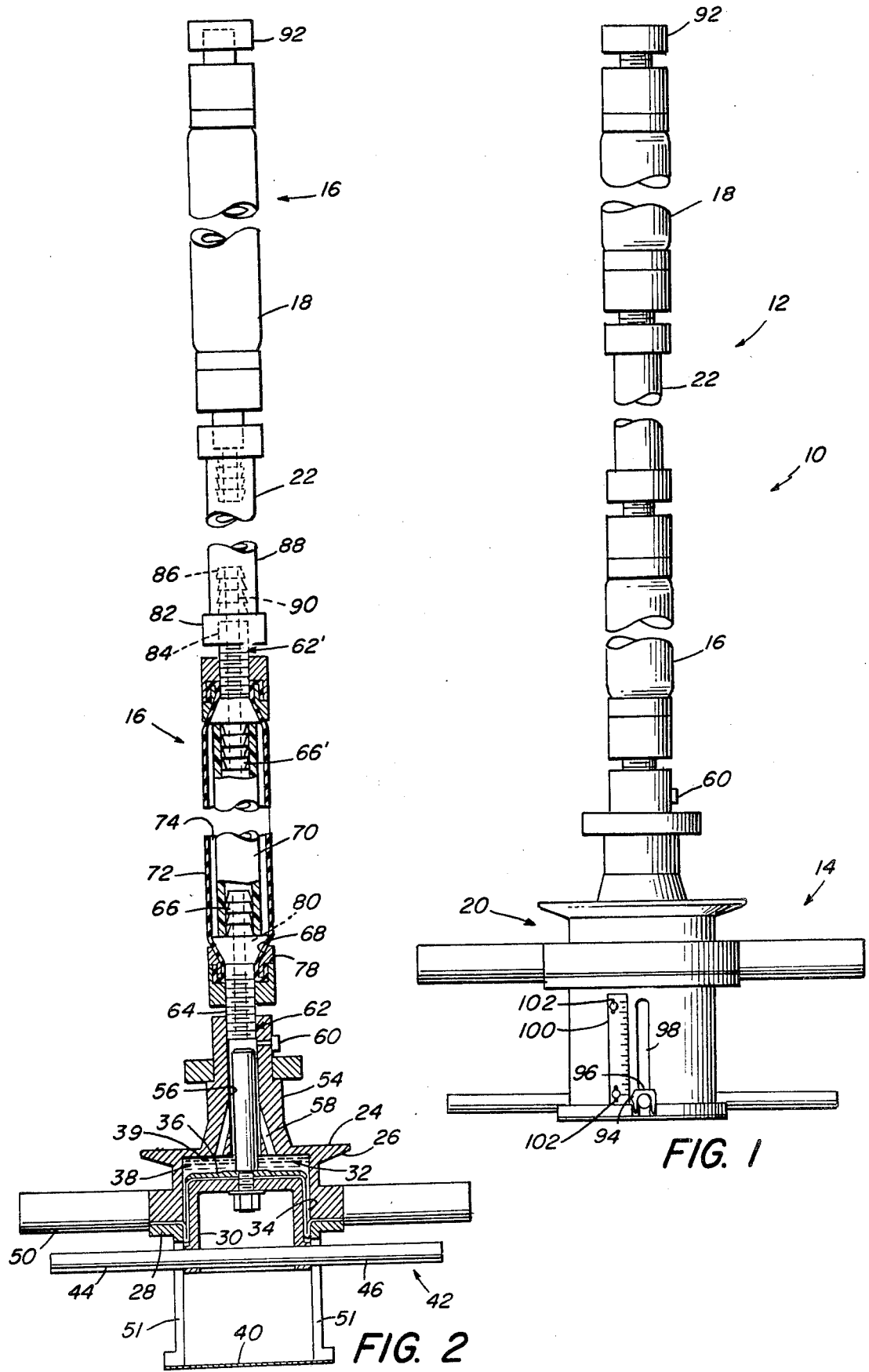

METHOD AND APPARATUS INVOLVING THE MEASUREMENT OF BORES

BACKGROUND OF THE INVENTION

1. Field of Invention

The present invention relates to methods and apparatuses for measuring cylindrical and substantially cylindrical bores and, more particularly, is directed toward methods and apparatuses for measuring the internal volume and nominal diameter of cylindrical and substantially cylindrical bores.

2. Description of the Prior Art

Rock bolt installations are evaluated on their ability to support mine roofs, expressed as the bolt pullout force. This force enables the bolts to resist sagging of the roof rock layers and separation of the immediate ceiling rock. One type of rock bolt with a longitudinally extending bore and slot, which is sold under the trademark Split Set, develops its frictional support against the rock by being forced into an undersized hole, closing down its longitudinal slot. This causes both elastic and plastic deformation of the bolt. Varying the hole diameter changes the amount of deformation, affecting the radial pressure and the resulting frictional force between the bolt and rock.

The pullout strength of a Split Set bolt may be determined by actually loading the bolt until it slips. This is a destructive test, since the support applied to the roof plate and the immediate ceiling rock is released (although frictional support along the length of the bolt is maintained). In order to perform a pull test, the bolt must be installed with an extra washer and spacer to provide a gripping surface for the pullout test collar. As a result, an extra Split Set bolt is installed in a section when a pull test is intended.

To date, evidence that a particular rock bolt installation is well anchored has been circumstantial or very inexact. Proper bolt hole size cannot be assured because of changes in bit wear, strata conditions, and operation of the drill. A need has arisen for an efficient and accurate apparatus and method for determining rock bolt pullout force.

SUMMARY OF THE INVENTION

An object of the present invention is to provide a method and apparatus for determining the internal volume and nominal diameter of cylindrical and substantially cylindrical bores.

Another object of the present invention is to provide a method and apparatus for determining the internal dimension of a rock bolt.

A further object of the present invention is to provide a method and apparatus for determining the pullout force of a rock bolt.

The apparatus embodying the invention includes an expander and a pump. The expander has an internal chamber which is bounded by a flexible outer skin, the expander being configured to be inserted into the bore which is to be measured. The pump has a piston which is slidable within a cylinder and forms a compressible cavity that communicates with the expander chamber. A fluid is contained within the compressible cavity. During a measurement cycle, the expander is inserted into the bore. The piston is moved and the pump cavity is compressed. The fluid enters the expander chamber and the flexible outer skin is pressed against the side of the bore. An indicator on the pump shows the quantity of fluid displaced in the pump cavity which is related to the internal volume of the bore being measured.

Other objects of the present invention will in part be obvious and will in part appear hereinafter.

The invention accordingly comprises the apparatuses and processes, together with their parts, steps, elements and interrelationships, that are exemplified in the following disclosure, the scope of which will be indicated in the appended claims.

BRIEF DESCRIPTION OF THE DRAWINGS

A fuller understanding of the nature and objects of the present invention will become apparent upon consideration of the following detailed description taken in connection with the accompanying drawings, wherein:

FIG. 1 is a perspective view of an apparatus made in accordance with the teachings of the present invention for determining the internal volume and nominal diameter of cylindrical and substantially cylindrical bores; and FIG. 2 is a cross-sectional view of the apparatus of FIG. 1.

DETAILED DESCRIPTION OF THE PREFERRED EMBODIMENTS

Referring now to the drawings, particularly FIG. 1, there is shown an apparatus 10 made in accordance with the teachings of the present invention for non-destructively measuring the internal volume and nominal diameter of any cylindrical or substantially cylindrical bore such as found in cylinders, pipes, tubes, or drilled holes.

Apparatus 10 includes expander means 12 and driver means 14. In the illustrated embodiment, by way of example, expander means 12 includes expanders 16 and 18, and driver means 14 includes a piston pump 20. Expanders 16 and 18 are connected in series by a flexible coupling assembly 22. It is to be understood that in alternate embodiments, the number of expanders is other than two, for example, one or three, or some other number. As hereinafter described, piston pump 20 is used to force a fluid into expanders 14 and 16 for determining the internal volume and nominal diameter of a cylindrical or substantially cylindrical bore, for example, the internal volume and nominal diameter of a roof bolt (not shown) of the type sold under the trademark Split Set.

As best shown in FIG. 2, pump 20, for example a hydraulic pump, includes a substantially cylindrical housing 24 having an upper section 26 and a lower section 28. A piston 30 is constrained for sliding movement along the longitudinal axis of housing 24 within a cylinder 32 formed in the housing. A rolling diaphragm 34 is clamped between upper and lower housings 26, 28 and is attached to the upper surface of the piston 30 by a retainer cap 36. A compressible cavity 38, which is configured to hold a fluid 39, for example water, is formed between rolling diaphragm 34 and upper housing 26. A cover 40 is provided at the lower end of housing 24 to close cylinder 32. A handle 42 having oppositely extending arms 44 and 46 is provided at the lower end of housing 24. Arms 44 and 46 are connected to diametrically opposite sides of piston 30 and extend in a direction normal to the longitudinal axis of housing 24. A grip 24 having extending arms 50 and 52 is provided at the upper end of housing 24. Arms 50 and 52 are diametrically opposite one another and extend in a direction which is normal to the longitudinal axis of housing 24. The distance between handle 42 and grip 48 is such that a person can grip arms 44 and 50 in one hand and arms 46 and 52 in the other hand. Grip 48 is fixed to housing 24 and handle 44 is movable toward and away from grip 48. Arms 44 and 46 travel in a pair of longitudinal slots 51 which are formed in housing 24. The upper end of housing 24 is provided with a neck 54 having an internally threaded bore 56. A conduit 58 provides a fluid path between cavity 38 and bore 56. Fluid 39 is removed from 56 through a bleeder valve 60. Expander 16 is turned into internally threaded bore 56.

As shown in FIG. 2, opposite ends of expander 16 are provided with adaptors 62 and 62'. Adaptor 62 has an externally threaded portion 64 at one end and a series of gripping teeth 66 at an opposite end. A collar 68, which tapers inwardly towards threaded end 64, is provided intermediate the ends of adapter 62. Adaptor 62' is similar in construction tp adaptor 62 and therefore, corresponding parts are identified by similar reference characters and distinguished by a prime notation. An expander core 70, for example, a hydraulic hose, is fitted onto gripping teeth 66 and 66'. An expander tube 72, which is composed of a flexible material, such as butyl rubber, is attached to expander 16 about expander core 70, a chamber 74 being formed between the expander tube and the expander core. The end of expander tube 74 is attached to adaptor 62 by means of a clamping nut 76 and a clamping collar 78. When nut 76 is turned onto threaded section 64, expander tube 72, which is threaded about clamping collar 78, is pressed against collar 68. The other end of expander tube 72 is attached to adaptor 62' in a similar fashion. Expander tube 72 defines a flexible outer skin which is constrained for movement in a direction normal to a longitudinal axis of expander 16. Adaptor 62 is formed with a central bore 80 which is opened to chamber 74, a fluid path being established between cavity 38 and chamber 74.

Flexible coupling assembly 22 is provided with an adaptor 82 having an internally threaded socket 84 at one end and gripper teeth 86 at the opposite end. One end of a flexible tubular member 88, for example, a hydraulic hose, is captively held by teeth 86. Adaptor 82 is provided with a central bore 90 which communicates with cavity 74. The opposite end of hydraulic hose 88 is captively held in an adaptor 82' which is similar to adaptor 82. Expander 18, which is similar in construction to expander 16, is threaded into adaptor 82'. The free end of expander 18 is provided with a removable cap 92 for filling cavity 38.

When cap 92 is removed, fluid 39 is poured into the end of expander 18. Fluid 39 passes through flexible assembly 22 and expander 16, and into cavity 38 within pump housing 24. After a sufficient quantity of fluid 39 has been poured into cavity 38, cap 92 is replaced. In order to calibrate the apparatus 10, expanders 16 and 18 are inserted into a bore having a known diameter. Handle 42 is squeezed towards grip 48, piston 30 moves and fluid 30 within cavity 38 is forced into chamber 74 between expander tube 72 and expander core 70 and into the corresponding chamber formed between the expander tube and expander core of expander 18. A finger 94 of an indicator 96, which is slidable within a slot 98 formed in housing 24 between cover 40 and the bottom of piston 30, points to a scale 100. In the preferred embodiment, scale 100 is mounted to housing 24 using a slotted holes 102 so that the scale may be moved up and down for fine adjustments. Coarse adjustments are made by opening bleeder valve 60 which allows the fluid to be removed from cavity 38. Scale 100 is moved until finger 94 points to the actual diameter of the calibration bore.

Apparatus 10 is used to make a measurement in the same manner as described in connection with the calibration process with the exception that scale 100 is not moved but merely read. In the measurement process, an operator inserts expanders 16 and 18 into a roof bolt, for example a Split Set bolt. Then, the operator squeezes handle 42 and grip 48 together. Piston 30 moves in a direction to compress cavity 38 and fluid 39 is forced into chamber 74 of expander 16 and the corresponding chamber in expander 18. When expander tube 72 or the outer skin of expander 16 and the corresponding expander tube or the outer skin of expander 18 press against the inner surface of the Split Set bolt, the operator will no longer be able to move handle 42 toward grip 48. Expander core 74 prevents longitudinal movement of expander 16, outer skin 72 stretching in a direction substantially normal to the longitudinal axis of expander 16. At this point, the internal volume or nominal diameter of the Split Set bolt is read on scale 100.

Since certain changes may be made in the foregoing disclosure without departing from the scope of the invention herein involved, it is intended that all matter contained in the above description and depicted in the accompanying drawings be construed in an illustrative and not in a limiting sense.

What is claimed is:

1. An apparatus for determining a nominal internal dimension, said apparatus comprising:
   (a) expander means sized to be received within a bore whose nominal diameter is to be determined, said expander means constrained for limited longitudinal movement, said expander means including fluid-filled movable engagement means;
   (b) drive means associated with said expander means for forcing the fluid into said engagement means and moving said engagement means in a substantially transverse direction into contact with the side of the bore whose nominal diameter is to be determined; and
   (c) measurement means associated with said drive means for providing an indication of the displaced fluid volume required to move said expander means into full contact with the side of the bore, the fluid displacement volume related to the nominal diameter of the bore.

2. The apparatus as claimed in claim 1 wherein said engagement means is a flexible member defining an outer skin of said expander means, said flexible member being sufficiently flexible so that it can be expanded into contact with the side of the bore.

3. The apparatus as claimed in claim 1 wherein said drive means is a pump.

4. The apparatus as claimed in claim 3 wherein said pump includes a housing and a piston, said piston constrained for reciprocating movement within said housing between deactivated and activated positions, a compressible cavity formed between said housing and said piston, a fluid contained within said cavity.

5. An apparatus for determining a nominal internal dimension, said apparatus comprising:
   (a) expander means sized to be received within a bore whose nominal diameter is to be determined, said expander means including movable engagement means, said engagement means being a flexible member defining an outer skin of said expander means, said flexible member being sufficiently flexible so that it can be expanded into contact with the side of the bore, said expander means including a tubular member which is disposed within said outer skin, said tubular member limiting longitudinal movement of said expander means;

(b) drive means associated with said expander means for moving said engagement means into contact with the side of the bore whose nominal diameter is to be determined; and (c) measurement means associated with said drive means for providing an indication of the movement of said expander means required to contact the side of the bore, the movement of said expander means related to the nominal diameter of the bore.

6. An apparatus for determining a nominal internal dimension, said apparatus comprising:

(a) expander means sized to be received within a bore whose nominal diameter is to be determined, said expander means including movable engagement means;

(b) a pump associated with said expander means for moving said engagement means into contact with the side of the bore whose nominal diameter is to be determined, said pump including a housing and a piston, said piston constrained for reciprocating movement within said housing between deactivated and activated positions, a compressible cavity formed between said housing and said piston, a fluid contained within said cavity; and (c) measurement means associated with said pump for providing an indication of the movement of said expander means required to contact the side of the bore, the movement of said expander means related to the nominal diameter of the bore;

(d) said engagement means including an outer member and said expander means including an inner member, a chamber formed between said inner and outer members, said chamber communicating with said compressible cavity.

7. The apparatus as claimed in claim 6 wherein said outer member is a flexible member constrained for expansion in a direction normal to a longitudinal axis of said expander means, said inner member limiting longitudinal movement of said outer member.

8. An apparatus for determining a nominal internal dimension, said apparatus comprising:

(a) expander means sized to be received within a bore whose nominal diameter is to be determined, said expander means including movable engagement means, said expander means including an inner flexible tubular member and said engagement means including an outer flexible tubular member coaxially mounted about said inner flexible tubular member, a chamber being formed between said tubular members;

(b) drive means associated with said expander means for moving said engagement means into contact with the side of the bore whose nominal diameter is to be determined; and (c) measurement means associated with said drive means for providing an indication of the movement of said expander means required to contact the side of the bore, the movement of said expander means related to the nominal diameter of the bore.

9. The apparatus as claimed in claim 8 wherein said drive means is a pump having a piston which is constrained for limited movement within a cylinder between activated and deactivated positions, a fluid contained in said cylinder, a fluid path being formed between said cylinder and said chamber formed between said tubular members.

10. The apparatus as claimed in claim 9 wherein said measuring means is display means mounted to said pump, said display means indicating the position of said piston.

11. The apparatus as claimed in claim 10 wherein said expander means includes a first expander and a second expander, and wherein said engagement means includes first and second engagement means, said first expander connected in series with said second expander, said first engagement means associated with said first expander and said second engagement means associated with said second expander, each said engagement means configured to engage the side of a bore whose nominal diameter is to be determined.

12. The apparatus as claimed in claim 11 wherein said first engagement means includes an outer first tubular member, and said first expander means includes an inner first tubular member and wherein said second engagement means includes an outer second tubular member and said second expander means includes an inner second tubular members, said inner and outer members being coaxial, said outer first tubular member being expandable in a direction normal to a longitudinal axis of said first expander means and said outer second tubular member being expandable in a direction normal to a longitudinal axis of said second expander means, a first chamber formed between said inner and outer first tubular members, a second chamber formed between said inner and outer second tubular members, a first fluid flow path provided between said first and second chambers.

13. The apparatus as claimed in claim 12 wherein said drive means has a compressible cavity, a fluid being contained within said cavity, a second fluid flow path provided between said cavity and said first and second chambers, said first and second fluid flow paths communicating with one another.

14. The apparatus as claimed in claim 13 wherein said drive means includes means for forcing said fluid contained in said compressible cavity into said first and second fluid flow paths, said forced fluid causing said first and second outer tubular members to expand in said normal direction.

15. A method for determining the nominal diameter of a bore, said method comprising the steps of:

(a) inserting expander means into a bore whose nominal diameter is to be determined, said expander means having flexible, fluid-filled movable engagement means;

(b) moving said engagement means in a substantially transverse direction into contact with the side of the bore while constraining said engagement means against longitudinal movement; and (c) measuring the volume of fluid displaced to move said engagement means into full contact with the side of the bore and determining the nominal diameter as a function of the volume of the displaced fluid.

16. The method as claimed in claim 15 wherein said moving step includes the step of forcing a fluid into said expander means and causing said engagement means to move into contact with the side of the bore.

17. The method as claimed in claim 16 wherein said fluid is forced into said expander means by moving the piston of a pump and compressing a cavity containing the fluid.

18. The method as claimed in claim 17 wherein said measuring step includes the step of presenting the movement of said piston on a scale.

* * * * *